US007283839B2

(12) United States Patent
You et al.

(10) Patent No.: US 7,283,839 B2
(45) Date of Patent: Oct. 16, 2007

(54) WIRELESS COMMUNICATING TERMINAL FOR PROVIDING INTEGRATED MESSAGING SERVICE AND METHOD THEREOF

(75) Inventors: Jin-Woo You, Seoul (KR); SangWoo Suk, Seoul (KR)

(73) Assignee: Curitel Communications, Inc. (KR)

( * ) Notice: Subject to any disclaimer, the term of this patent is extended or adjusted under 35 U.S.C. 154(b) by 226 days.

(21) Appl. No.: 11/106,160

(22) Filed: Apr. 13, 2005

(65) Prior Publication Data

US 2005/0245281 A1 Nov. 3, 2005

(30) Foreign Application Priority Data

Apr. 14, 2004 (KR) .................. 10-2004-0025882
Oct. 18, 2004 (KR) .................. 10-2004-0083073

(51) Int. Cl.
*H04M 1/00* (2006.01)
(52) U.S. Cl. .................. 455/550.1; 455/466; 455/418; 709/213; 709/201
(58) Field of Classification Search ............. 455/550.1, 455/466, 418; 709/213, 201
See application file for complete search history.

(56) References Cited

U.S. PATENT DOCUMENTS

| 6,556,217 | B1* | 4/2003 | Makipaa et al. ............ 345/667 |
| 6,952,712 | B2* | 10/2005 | Yoshimura et al. ......... 709/201 |
| 7,136,917 | B2* | 11/2006 | Kawai et al. ............... 709/223 |
| 2001/0028605 | A1* | 10/2001 | Higuchi et al. ............ 368/37 |
| 2002/0015112 | A1* | 2/2002 | Nagakubo et al. .......... 348/734 |
| 2003/0005125 | A1* | 1/2003 | Berthaud et al. ........... 709/226 |
| 2003/0095518 | A1* | 5/2003 | Suwa ........................ 370/336 |
| 2004/0015547 | A1 | 1/2004 | Griffin et al. |
| 2004/0165721 | A1* | 8/2004 | Sano et al. ................... 380/28 |
| 2004/0253965 | A1* | 12/2004 | Sato et al. ................ 455/456.3 |
| 2005/0164721 | A1* | 7/2005 | Yeh et al. ................... 455/466 |

FOREIGN PATENT DOCUMENTS

| EP | 1 109 415 A2 | 6/2001 |
| EP | 1 349 407 A2 | 1/2003 |

* cited by examiner

*Primary Examiner*—Danh Le
(74) *Attorney, Agent, or Firm*—Blakely Sokoloff Taylor & Zafman

(57) ABSTRACT

Provided is a wireless communication terminal having a function of providing an integrated messaging service. The wireless communication terminal includes: a wireless transceiver for transceiving a message to/from an outside device through a wireless network; a storage for storing an integrated messaging service program and messages; a keypad for receiving a message content and a menu selecting signal in the IUI; a displayer for displaying the message content and description data in the IUI; and a controller for providing the IUI to the keypad and the displayer, determining a message kind of the message to be transmitted, generating an outgoing message including identification data, transmitting the outgoing message, displaying the message content and the description data in the IUI, determining a message kind of a received message, dividing the received message into a message content and description data, and displaying the message content and the description data in the IUI.

5 Claims, 6 Drawing Sheets

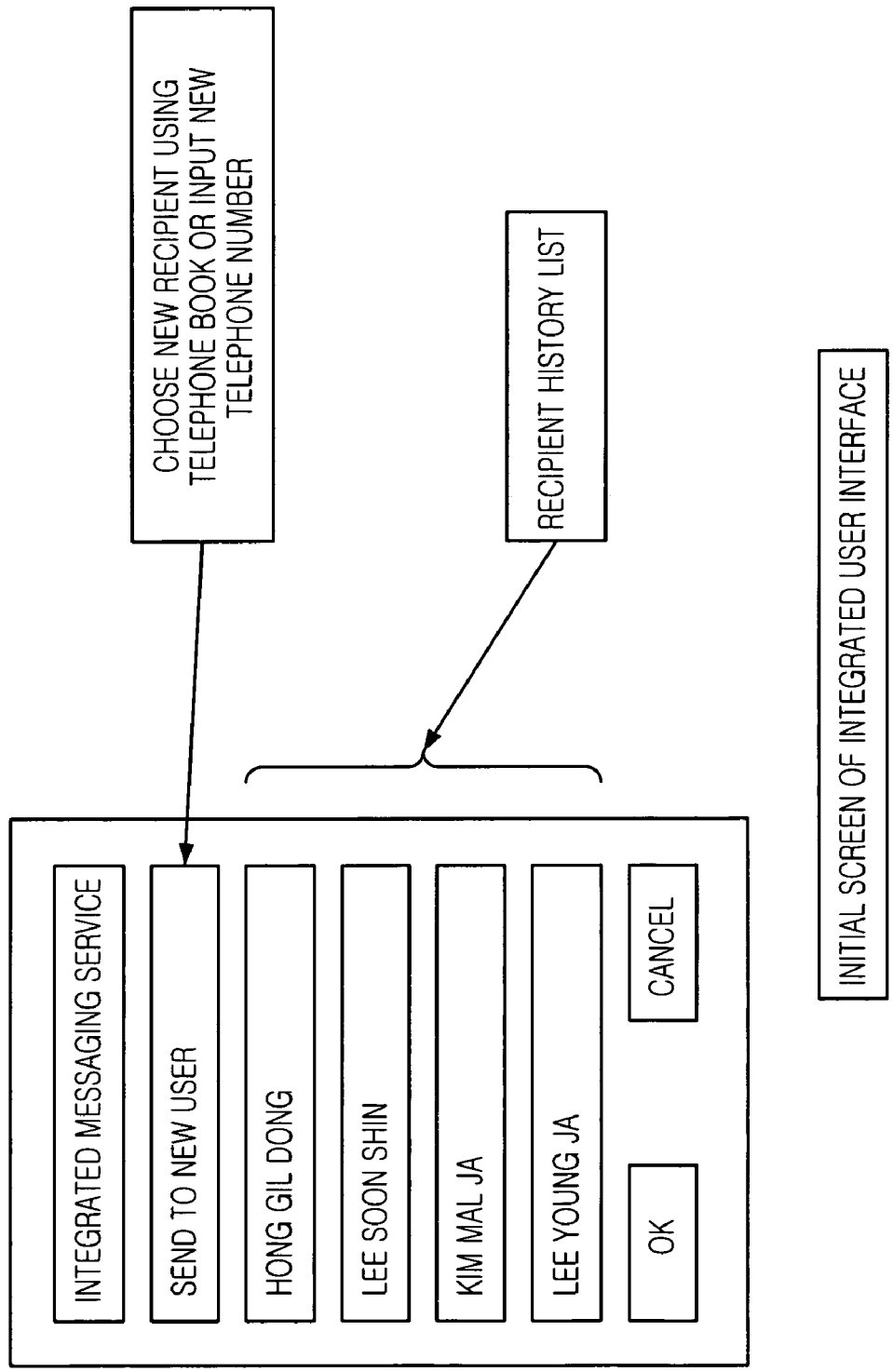

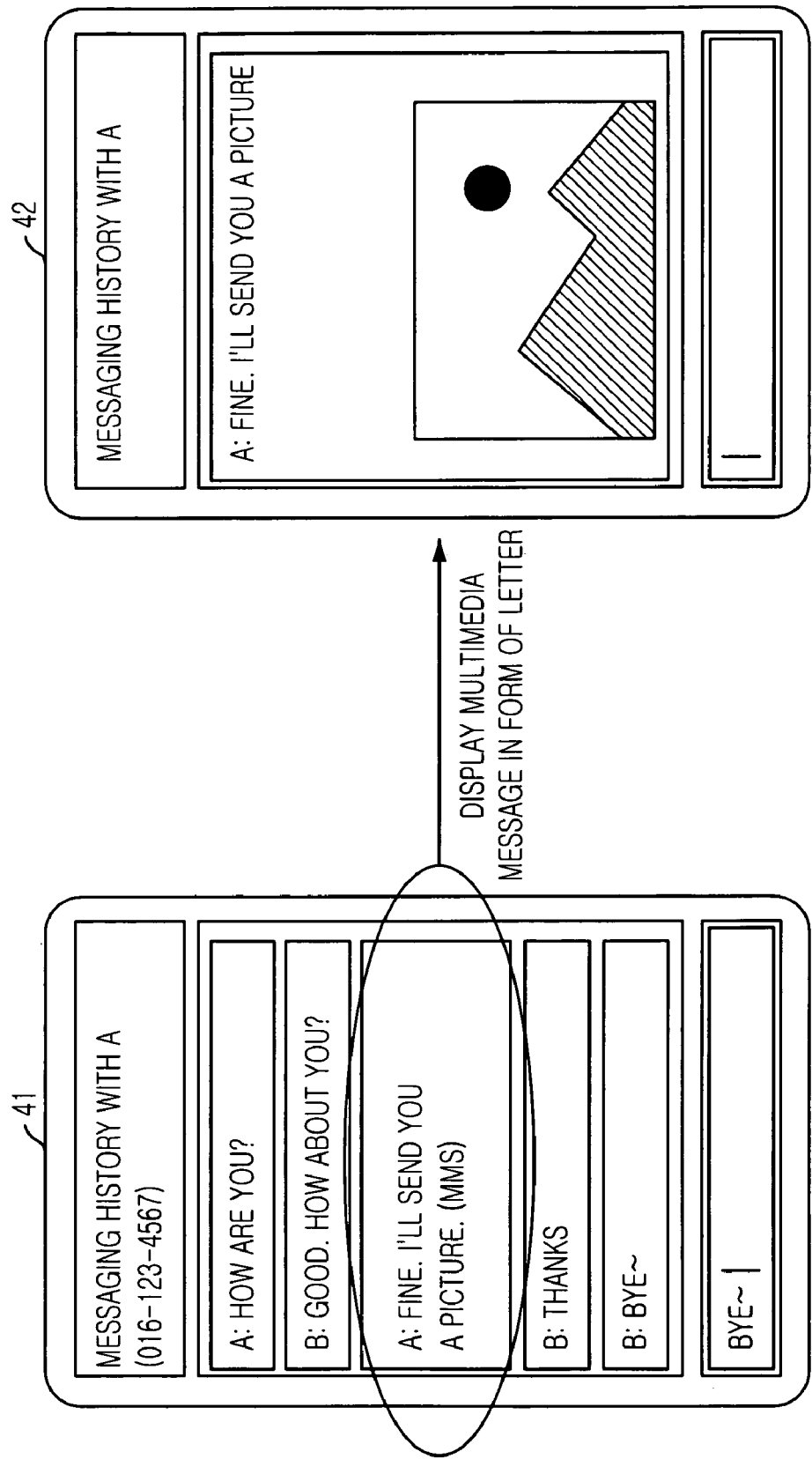

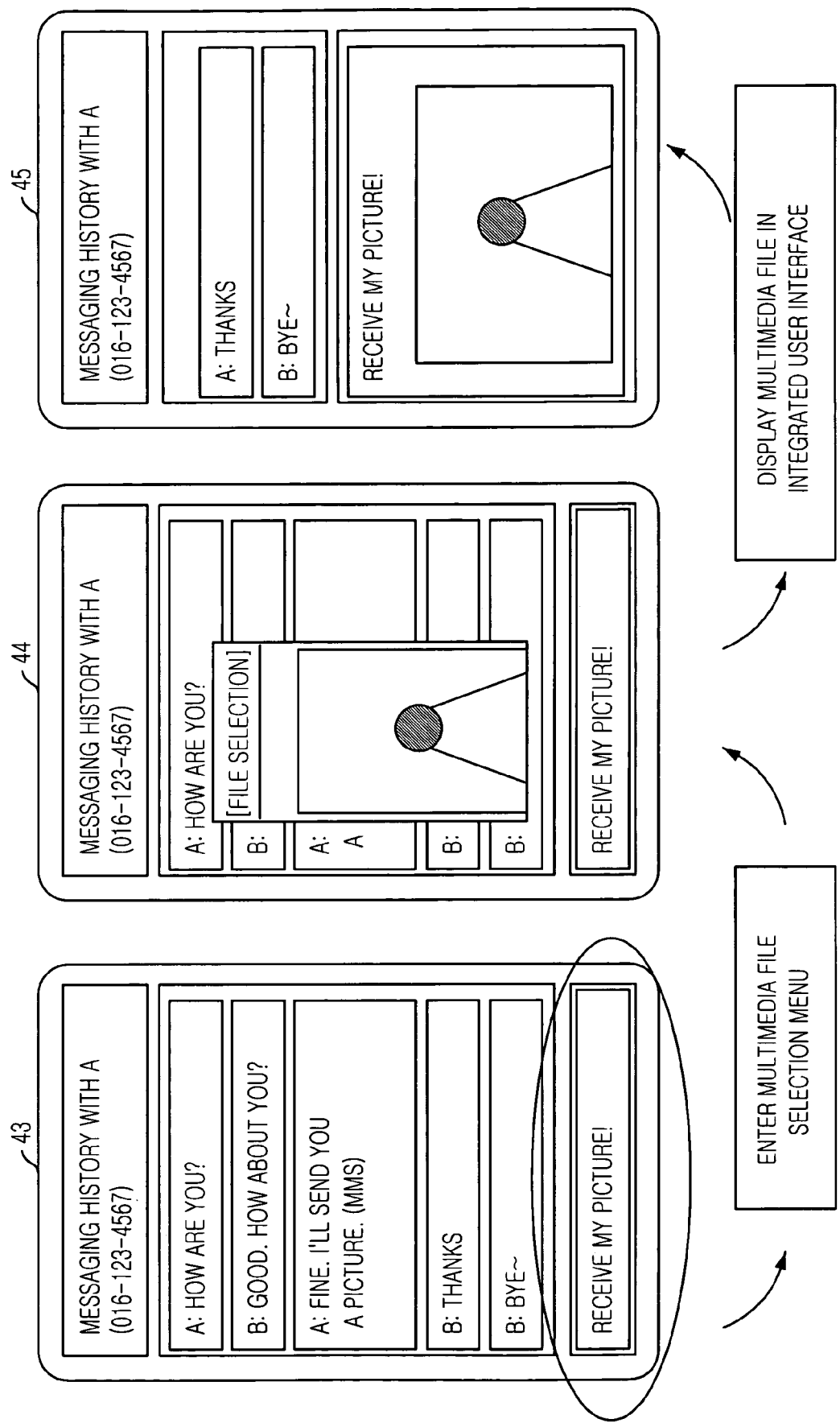

WIRELESS COMMUNICATING TERMINAL FOR PROVIDING INTEGRATED MESSAGING SERVICE AND METHOD THEREOF

FIELD OF THE INVENTION

The present invention relates to a wireless communication terminal having a function of providing an integrated messaging service; and, more particularly, to a wireless communication terminal and a method for transmitting and receiving various kinds of messages, e.g., a text message and a multimedia message, by using an integrated messaging service program without changing a transmission protocol or a network.

DESCRIPTION OF RELATED ART

A wireless communication terminal includes a mobile communication terminal, a Personal Communication Station (PCS), a Personal Digital Assistance (PDA), a smart phone, an International Mobile Telecommunication (IMT)-2000 terminal and a wireless Local Area Network (LAN) terminal capable of transmitting and receiving multimedia contents, e.g., text data, voice data, images, and moving pictures.

The wireless communication terminal provides functions of voice communications and a text messaging. Recently, the mobile terminal is provided with a multimedia message transceiving service including text data, voice data, images, and moving pictures.

A conventional wireless communication terminal provides messaging services in different user interfaces according to the kind of messages e.g., a text message and a multimedia message.

Therefore, in the conventional method, a user should use a different interface according to the message kind to transmit and receive the text message or the multimedia message.

Also, although the user does not need to know each technology used for each message type, the conventional wireless terminal provides different terms for each of messaging menus. Therefore, there is a problem that the user should use the various messaging services frequently in the conventional method.

The conventional wireless communication terminal manages incoming/outgoing messages in an in-box and an out-box based on a concept that the message is a kind of a letter. The conventional messaging service provides late response in a communication, compared to an Internet instant messenger.

SUMMARY OF THE INVENTION

It is, therefore, an object of the present invention to provide a wireless communication terminal and a method for transmitting and receiving different kinds of messages, e.g., a text message and a multimedia message in an integrated user interface by using an integrated messaging service program in order to provide an easy and user-friendly interface without modifying a transmission protocol or a network.

In accordance with an aspect of the present invention, there is provided a wireless communication terminal having a function of providing an integrated messaging service, the wireless communication terminal including: a wireless transceiver for transceiving a message to/from an outside device through a wireless network; a storage for storing an integrated messaging service program and messages in order to provide an integrated user interface (IUI); a keypad for receiving a message content and a menu selecting signal in the IUI; a displayer for displaying the message content and description data in the IUI; and a controller for providing the IUI to the keypad and the displayer by operating the integrated messaging service program, determining a message kind of the message to be transmitted which is inputted in the IUI, generating an outgoing message including identification data corresponding to the message kind, transmitting the outgoing message, displaying the message content and the description data of the outgoing message in the IUI, determining a message kind of a received message, dividing the received message into a message content and description data, displaying the message content and the description data in the IUI, and controlling elements in the wireless communication terminal.

In accordance with another aspect of the present invention, there is provided a method for transmitting a message in a wireless communication terminal for providing an integrated messaging service, the method including the steps of: inputting a message content in an IUI; determining a message kind of the message content; generating an outgoing message including identification data; transmitting the outgoing message to a receiving terminal; and displaying the message content with description data in the IUI.

In accordance with another aspect of the present invention, there is provided a method for receiving a message in a wireless communication terminal for providing an integrated message service, the method including the steps of: determining a message kind of an incoming message; informing of the incoming message to a user; when a display form transformation request is received, dividing the incoming message into a message content and identification data and transforming the message content into a display form of an IUI; and displaying the transformed message content and description data in the IUI.

BRIEF DESCRIPTION OF THE DRAWINGS

The above and other objects and features of the present invention will become apparent from the following description of the preferred embodiments given in conjunction with the accompanying drawings, in which:

FIGS. 4A to 4C are block diagrams showing an integrated user interface in a wireless communication terminal having a function of providing an integrated message service in accordance with a preferred embodiment of the present invention.

DETAILED DESCRIPTION OF THE INVENTION

Hereinafter, a wireless communication terminal and the method for providing the integrated messaging service will be described in detail with reference to the accompanying drawings.

The wireless communication terminal in accordance with the present invention can transmit/receive various kinds of messages such as a text message and a multimedia message.

Figure 1:
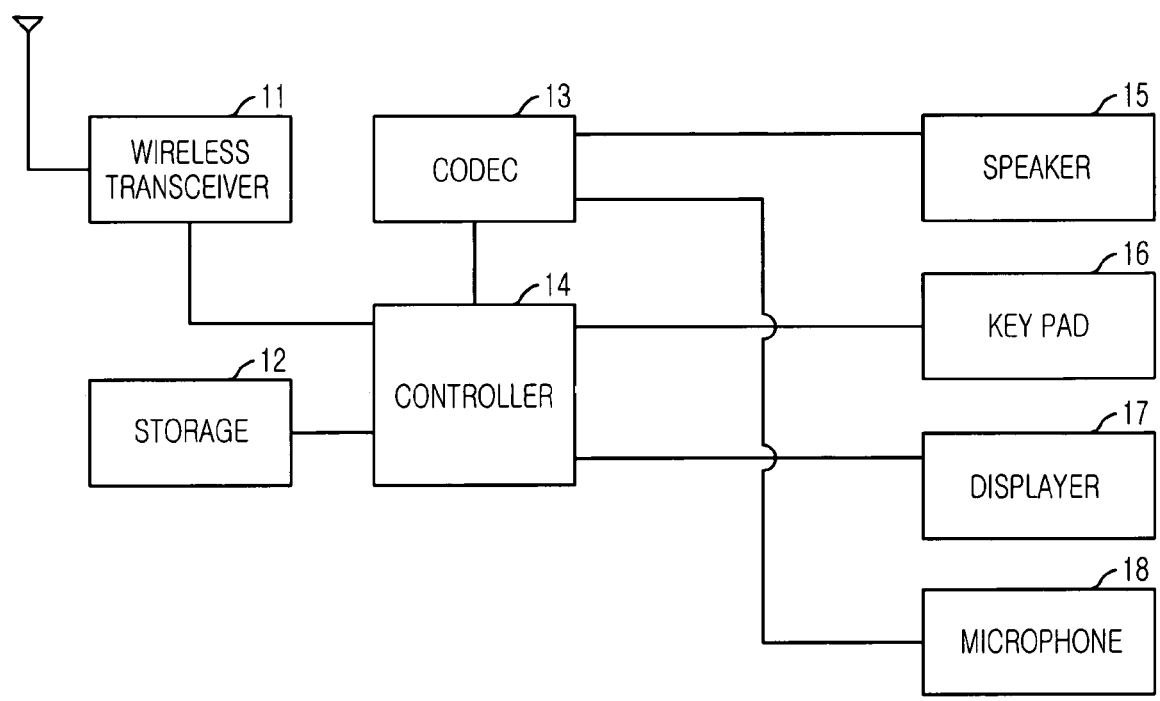
FIG. 1 is a block diagram showing a wireless communication terminal having a function of providing an integrated message service in accordance with a preferred embodiment of the present invention.

FIG. 1 is a block diagram showing the wireless communication terminal having a function of providing an integrated message service in accordance with a preferred embodiment of the present invention.

As shown, the wireless communication terminal having a function of providing an integrated messaging service includes a wireless transceiver 11, a storage 12, a CODEC 13, a controller 14, a speaker 15, a keypad 16, a displayer 17 and a microphone 18.

The wireless transceiver 11 transmits/receives a text message and an informing message of a multimedia message to/from another terminal through a wireless network and transmits/receives the multimedia message including a multimedia file to/from a multimedia contents server.

The storage 12 stores an integrated messaging program, a phone book, wherein the integrated messaging program provides an integrated user interface (IUI) for transmitting/receiving messages regardless of a message kind and the phone book includes a telephone number and a nick name of another terminal.

The CODEC 13 converts a voice signal received from the wireless communication terminal into voice and outputs the voice to the speaker 15. Also, the CODEC 13 converts the voice received from the microphone 18 into the voice signal and then transmits the voice signal to the controller 14 so that the voice signal is released through the wireless transceiver 11 under the control of the controller 14.

The controller 14 provides the IUI to the inputting unit 16 and the displayer 17 by operating the integrated messaging program stored in the storage 12. When the wireless communication terminal transmits a message (hereinafter, which is referred to as an outgoing message), the controller 14 determines the message kind of an outgoing message based on whether a multimedia file is included in the message content or not; generates the outgoing message provided with identification data of a determined message kind and transmits the outgoing message; and displays the message content and the identification data of the outgoing message in the IUI. When the wireless communication terminal receives a message (hereinafter, which is referred to as an incoming message), the controller 14 determines the message kind of the incoming message based on the identification data of the incoming message; divides the incoming message into message content and the identification data and transforms the message content according to a display form of the IUI; displays the message content and description data; and controls other elements included in the wireless communication terminal.

The speaker 15 receives the voice from the CODEC 13 and outputs the voice.

The inputting unit 16 receives the message content of the outgoing message and a menu selection signal from the user in the integrated user interface.

The displayer 17 displays the message content of the incoming and outgoing message and the description data.

The microphone 18 receives the voice and transmits the voice to the CODEC 13.

Figure 2:
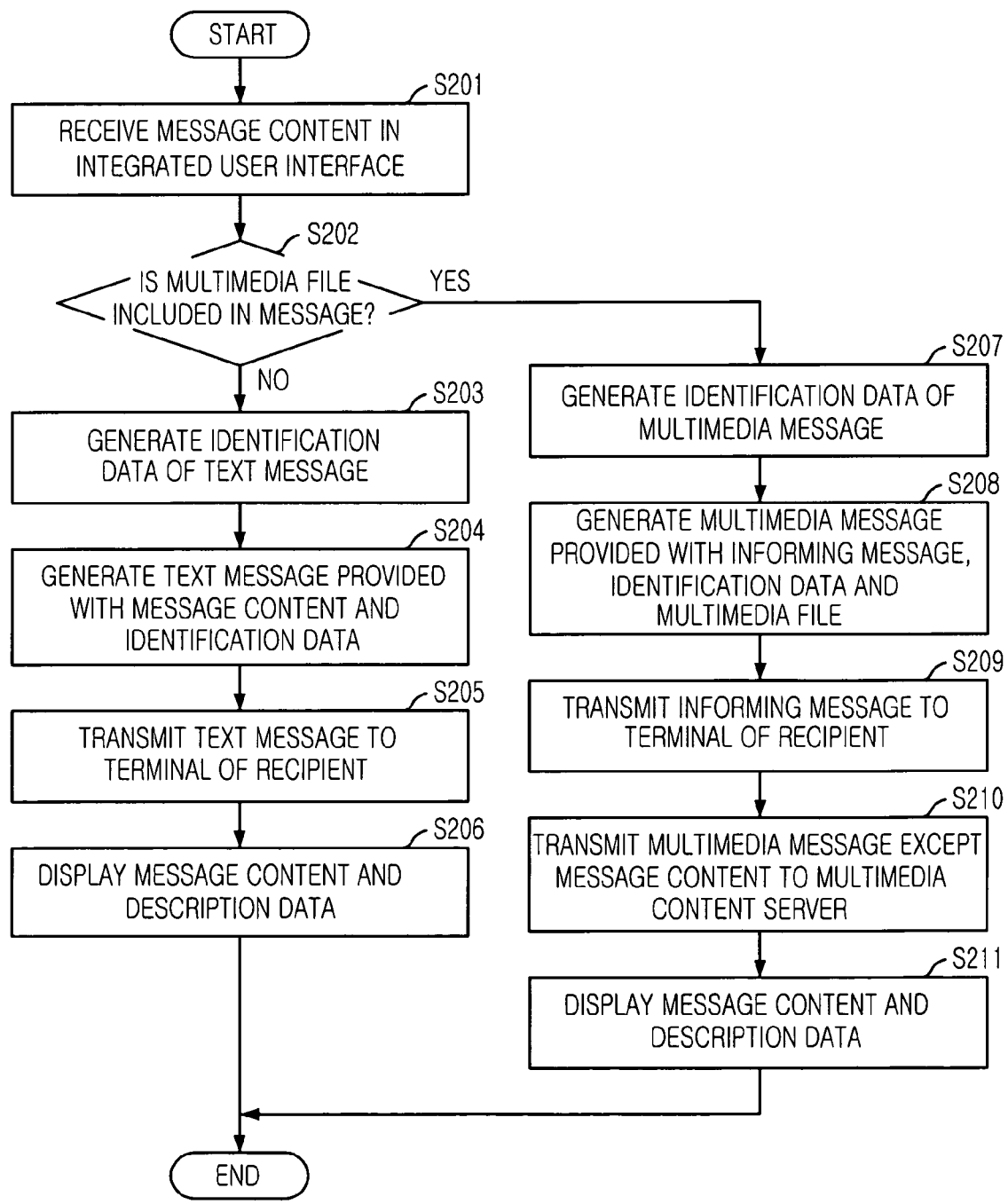
FIG. 2 is a flowchart describing a method for transmitting a message in a wireless communication terminal having a function of providing an integrated message service in accordance with a preferred embodiment of the present invention.

FIG. 2 is a flowchart describing a method for transmitting a message in the wireless communication terminal having a function of providing an integrated message service in accordance with a preferred embodiment of the present invention.

A message content of the outgoing message is inputted by a user in the IUI at step S201. Because the IUI is one of main menus of the wireless communication terminal, the integrated messaging service is operated automatically by the controller 14 to provide the IUI when the power of the wireless communication terminal is turned on. Therefore, the IUI can be used without an additional request for operating the integrated messaging service.

The controller 14 determines the kind of a message according to whether a multimedia file is included in the message content or not at step S202. If the message content include only texts, the kind of the message content is determined as a text message. If the message content include a multimedia file, the kind of a message is determined as a multimedia message.

The multimedia file means a file including text, image, voice and/or moving pictures. The multimedia file must be transmitted to a receiving terminal through the multimedia contents server differently from the text that is transmitted to the receiving terminal directly.

If the message kind of the outgoing message is the text message, the identification data for the text message is generated at step S203. The identification data include caller information such as a telephone number and a name and time information such as transmission time.

The outgoing message which is a text message (hereinafter, which will be referred to as an outgoing text message) provided with the message content and the identification data are generated at step S204, and the outgoing text message is transmitted to the receiving terminal at step S205.

The identification data identify the kind of the outgoing message. The text message and the multimedia message are transmitted to the receiving terminal in different routes. Therefore, the identification data of the text message are different from the identification data of the multimedia message.

The message content of the outgoing text message, i.e., the text is transformed into a display form of the IUI and displayed with description data in the IUI at step S206.

The description data present the description of the incoming/outgoing messages in the IUI on the displayer. The description data include incoming/outgoing description data for indicating the incoming message or the outgoing message and file description data, which are applied to only multimedia messages, for indicating a kind of multimedia files such as images, voice and moving images.

For example, the incoming/outgoing description data can be a sender/recipient name, a nickname, a telephone number or an icon, and the incoming/outgoing description data are displayed on a side of the message content. Also, the file description data can be icons, thumbnails or snapshots of the moving pictures and the file description data are displayed to inform that the multimedia files are included in the messages.

At the step S206, the description data for the outgoing text message includes the outgoing description data.

If the message kind of the outgoing message is the multimedia message, the identification data for the multimedia message are generated at step S203. The identification data for the multimedia messages include the caller information such as a telephone number and a name, the time information such as transmission time, and multimedia file information at step S207.

The multimedia message including the multimedia file and the informing message of the multimedia message are generated at step S208. The informing message is a text message for informing multimedia message transmission and it includes the message content except the multimedia file and the identification data generated at step S207.

The informing message is transmitted to the receiving terminal at step S209 and the multimedia message is transmitted to the multimedia contents server so that the receiving terminal can access to the multimedia contents server to receive the multimedia message with the multimedia file at step S210.

The message content is transformed into the display form of the IUI and displayed with the description data, wherein the description data include the outgoing description data and the multimedia file data.

Figure 3:
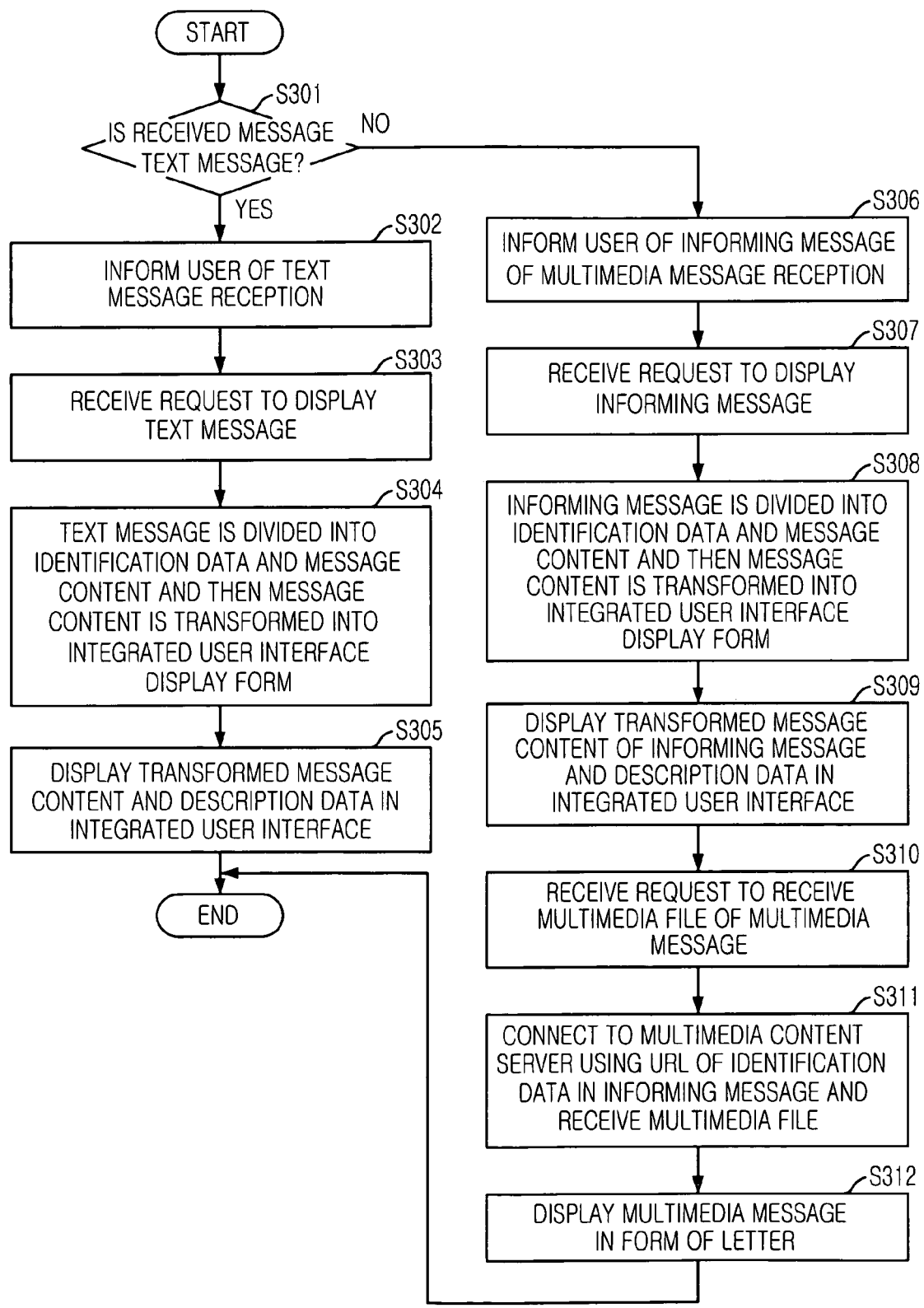
FIG. 3 is a flowchart describing a method for receiving a message of a wireless communication terminal having a function of providing an integrated message service in accordance with a preferred embodiment of the present invention.

FIG. 3 is a flowchart describing a method for receiving a message of a wireless communication terminal having a function of providing an integrated message service in accordance with a preferred embodiment of the present invention.

The message kind of the message received from a transmitting terminal (hereinafter, which is referred to as an incoming message) is determined based on the identification data included in the incoming message at step S301.

If the incoming message is a text message, reception of the incoming message is informed to the user by using an icon, sound or vibration at step S302.

When a request signal for displaying the text message is received through the inputting unit at step S303, the text message is divided into the message content and the identification data at step S304 and the message content is transformed into the display form of the IUI at step S304.

The message content of the text message and the description data are displayed in the IUI at step S305.

If the incoming message is an informing message, reception of the incoming message which is a multimedia message is informed to the user by using an icon, sound or vibration at step S306.

When a request signal for displaying the multimedia message is received through the inputting unit 17 at step S307, the informing message is divided into the identification data and the message content and then the message content is transformed into the display form of the IUI at step S308.

The message content of the informing message and the description data are displayed in the IUI at step S309, wherein the description data include the incoming description data and the file description data. The file description data can be obtained based on the identification data.

When a request signal for receiving the multimedia message is received through the inputting unit 17 at step S307, the receiving terminal accesses to the multimedia contents server having a Uniform Resource Locator (URL) of the identification data in the informing message and receives the multimedia message with the multimedia file at step S311.

The displayer 16 displays the multimedia message in a display form of a letter supported the conventional wireless communication terminal at step S312.

When a user uses a messaging service in the initial time, the user selects an IUI menu in an initial menu screen to transmit/receive a message in the IUI. On other hand, if a new message is transmitted or received when the user uses the messaging service in the IUI, a message list is scrolled on the displayer so that the oldest message disappears in the message list and the new message is displayed in the message list in a sequence of message reception/transmission. The oldest message can be back to be displayed again upon a user request.

FIGS. 4A and 4C are diagrams illustrating integrated user interface of the wireless communication terminal having an integrated messaging service in accordance with an embodiment of the present invention.

FIG. 4A shows an initial screen display of the integrated user interface outputted to provide the integrated messaging service upon a menu selecting signal from the user in accordance with an embodiment of the present invention. Prior to regular message transmission/reception, a user selects a message receiving part to receive a message on the integrated user interface by searching the telephone book, inputting a telephone number directly, or selecting a particular person in the recent call record, which is a list containing recent message transmitting/receiving parts who have transmitted/received messages through the integrated user interface.

FIG. 4B presents an example of messages transmitted and received between a user A and a current user B of the wireless communication terminals. To identify transmitted/received message, 'A' and 'B,' which mean two users, are used as transmitting/receiving identifying information. Also, '(MMS)' is used as data classifying information to distinguish the data type of a multimedia message. Also, it is possible to realize the data classifying information in forms of icons, thumbnail preview images, and miniaturized images from the first scene of video in order to distinguish the data type more in detail.

As shown in a display image 41 of FIG. 4B, short messages transmitted/received between the users A and B and an informing message of a multimedia message transmitted from the user A are outputted onto the integrated user interface in the transmitted/received order. Herein, the messages outputted onto the integrated user interface can be displayed in a plurality of lines or they can be displayed in the form of a letter supported in the conventional wireless communication terminal by selecting a particular message with a cursor or an item selecting signal. Then, a message outputted upon the selection can be converted into an output form of the integrated user interface, i.e., a messenger form. For example, when a short message is elected with a cursor, a full text message is outputted in a plurality of lines. Before the selection, only part of the text message is displayed. When the short message selected with the cursor is selected again by using an item selecting signal, it can be outputted in a letter form, which is supported in the conventional wireless communication terminal, on the entire screen, instead of being outputted in the output form of the integrated user interface.

An image 42 of FIG. 4B shows a display outputted when an informing message of the multimedia message shown in the image 41 is selected by using the item selecting signal. The wireless communication terminal accesses to a multimedia contents server based on the URL of identifying information included in the informing message, receives the multimedia message, i.e., a multimedia file, and outputs it in a letter form of the integrated user interface supported in the conventional wireless communication terminal. It is also possible to convert the output form from the letter form to the integrated user interface upon a request from the user.

As described above, an entire message can be outputted in the integrated user interface by selecting the cursor and an item selecting signal, and it can be also outputted in the output form of the integrated user interface in the letter form supported by the conventional wireless communication terminal compatibly.

Meanwhile, referring to images 43 and 45 of FIG. 4C, a multimedia message is authored by the user B on an input window of the integrated user interface.

That is, after the text content to be included in the multimedia message is inputted (to be more precise, after the text content is included in an informing message and transmitted), which is shown in the image 43 of FIG. 4C, the user B enters the file selecting menu by inputting a predetermined key and selects a multimedia file to be transmitted to another user, such as an image file, which is shown in an image 44 of FIG. 4C. Herein, the predetermined key means a predetermined menu key, a side key, or a soft key. The key can be embodied in diverse methods. The multimedia file selected by the user B is converted to conform to the output form of the integrated user interface and displayed on the input window and, thus, previously transmitted and received messages are scrolled up and not shown on the monitor, which is illustrated in an image 45 of FIG. 4C.

Also, the image 45 of FIG. 4C shows that the size of the input window is changed, as the size of the message inputted by the user B becomes large. For example, in case where the content of the text message is long, the size of the input window becomes large. If a multimedia file is attached, the input window becomes small to show the file. Herein, data classification information can be used to inform the user of the attachment of the multimedia file, instead of outputting the file itself.

As described above, the present invention provides an integrated user interface for transmitting/receiving diverse kinds of messages through one integrated user interface by using an integrated messaging service program.

The present invention provides a wireless communication terminal and a method for transmitting and receiving messages of various kinds, e.g., a text message and a multimedia message, by using an integrated messaging service program without changing a transmission protocol or a network to thereby provide a user-friendly interface to a user.

The present invention provides user-friendly interface of the messaging service so that the user can use multimedia messaging service frequently and provides an instant messenger-like interface that can be compared with the conventional messaging service so that the user can exchange responses fast using the integrated messaging service.

Since the present invention can be embodied without changing the conventional protocol or the network, it does not require additional expense for it.

The present application contains subject matter related to Korean patent application Nos. 2004-25882 and 2004-83073, filed in the Korean intellectual Property Office on Apr. 14, 2004, and Oct. 18, 2004, respectively, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A wireless communication terminal having a function of providing an integrated messaging service, the wireless communication terminal comprising:
   a wireless transceiver for transceiving a message to/from an outside device through a wireless network;
   a storage for storing an integrated messaging service program and messages in order to provide an integrated user interface (IUI);
   a keypad for receiving a message content and a menu selecting signal in the IUI;
   a displayer for displaying the message content and description data in the IUI; and
   a controller for providing the IUI to the keypad and the displayer by operating the integrated messaging service program, determining a message kind of the message to be transmitted which is inputted in the IUI, generating an outgoing message including identification data corresponding to the message kind, transmitting the outgoing message, displaying the message content and the description data of the outgoing message in the IUI, determining a message kind of a received message, dividing the received message into a message content and description data, displaying the message content and the description data in the IUI, and controlling elements in the wireless communication terminal.

2. The wireless communication terminal as recited in claim 1, wherein the description data include incoming/outgoing description data in order to present whether the message is transmitted or received.

3. The wireless communication terminal as recited in claim 1, wherein the controller generates a multimedia message including a multimedia file and transmits the multimedia message to a multimedia contents server so that a wireless communication terminal of a receiving part accesses to the multimedia contents server and receives the multimedia message when the outgoing message is a multimedia message; and
   the controller accesses to the multimedia contents server based on a Uniform Resource Locator (URL) included in an informing message and receives the multimedia message including the multimedia file to thereby display the multimedia message in the IUI when an incoming message is an informing message of the multimedia message.

4. The wireless communication terminal as recited in claim 3, wherein the outgoing/incoming message is displayed with incoming/outgoing description data to indicate whether the message is transmitted or received and file description data to present a file kind included in the message content.

5. The wireless communication terminal as recited in claim 3, wherein when a display form transformation request is received, an IUI display form is transformed into a conventional display form or the conventional display form into the IUI display form, and the message content is displayed on the displayer.

* * * * *